(12) United States Patent
Jain et al.

(10) Patent No.: US 7,467,256 B2
(45) Date of Patent: Dec. 16, 2008

(54) PROCESSOR HAVING CONTENT ADDRESSABLE MEMORY FOR BLOCK-BASED QUEUE STRUCTURES

(75) Inventors: Sanjeev Jain, Shrewsbury, MA (US); Gilbert M. Wolrich, Framingham, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 11/027,601

(22) Filed: Dec. 28, 2004

(65) Prior Publication Data

US 2006/0143373 A1 Jun. 29, 2006

(51) Int. Cl.
*G06F 12/00* (2006.01)

(52) U.S. Cl. .................. 711/108; 711/154; 711/169; 365/49.1; 710/39

(58) Field of Classification Search .............. 710/108; 711/108
See application file for complete search history.

(56) References Cited

U.S. PATENT DOCUMENTS

| | | | |
|---|---|---|---|
| 4,646,271 A * | 2/1987 | Uchiyama et al. ............ 365/49 |
| 5,257,218 A | 10/1993 | Poon | |
| 5,398,244 A | 3/1995 | Mathews et al. | |
| 5,442,576 A | 8/1995 | Gergen et al. | |
| 5,455,599 A | 10/1995 | Cabral et al. | |
| 5,460,349 A | 10/1995 | Campbell et al. | |
| 5,477,383 A | 12/1995 | Jain | |
| 5,548,795 A | 8/1996 | Au | |
| 5,627,995 A * | 5/1997 | Miller et al. ............... 711/171 |
| 5,974,525 A | 10/1999 | Lin et al. | |
| 5,995,967 A * | 11/1999 | Iacobovici et al. .......... 707/100 |
| 6,055,579 A * | 4/2000 | Goyal et al. ................ 713/375 |
| 6,169,685 B1 * | 1/2001 | Gandini et al. ............... 365/49 |
| 6,233,655 B1 * | 5/2001 | Shum et al. ................. 711/127 |
| 6,247,116 B1 | 6/2001 | Abdallah et al. | |
| 6,263,426 B1 | 7/2001 | Abdallah et al. | |
| 6,266,769 B1 | 7/2001 | Abdallah et al. | |
| 6,282,554 B1 | 8/2001 | Abdallah et al. | |
| 6,292,815 B1 | 9/2001 | Abdallah et al. | |
| 6,307,789 B1 | 10/2001 | Wolrich et al. | |
| 6,324,624 B1 | 11/2001 | Wolrich et al. | |
| 6,427,196 B1 | 7/2002 | Adiletta et al. | |
| 6,442,697 B1 | 8/2002 | Jain et al. | |
| 6,463,072 B1 | 10/2002 | Wolrich et al. | |
| 6,469,925 B1 | 10/2002 | Jain | |
| 6,480,868 B2 | 11/2002 | Abdallah et al. | |

(Continued)

OTHER PUBLICATIONS

Gene Cooperman, "DDR RAM", 2003. http://www.ccs.neu.edu/course/com3200/parent/NOTES/DDR.html.*

(Continued)

*Primary Examiner*—Kevin L Ellis
*Assistant Examiner*—Kalpit Parikh
(74) *Attorney, Agent, or Firm*—Daly, Crowley, Mofford & Durkee, LLP

(57) ABSTRACT

Queuing command information is stored in a content addressable memory (CAM) where a queuing command for a first queue is received, the CAM is examined to determine if commands for the first queue are present, and if commands for the first queue were found to be present, information is stored in a linked list for the received command in multiple CAM entries.

16 Claims, 13 Drawing Sheets

U.S. PATENT DOCUMENTS

| | | |
|---|---|---|
| 6,502,115 B2 | 12/2002 | Abdallah et al. |
| 6,510,075 B2 | 1/2003 | Jain |
| 6,532,509 B1 | 3/2003 | Wolrich et al. |
| 6,549,451 B2 | 4/2003 | Jain |
| 6,553,453 B1 * | 4/2003 | Gibson et al. ............... 711/108 |
| 6,560,667 B1 | 5/2003 | Wolrich et al. |
| 6,571,333 B1 | 5/2003 | Jain et al. |
| 6,574,738 B2 | 6/2003 | Jain et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,598,140 B1 | 7/2003 | McAllister et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,633,987 B2 | 10/2003 | Jain et al. |
| 6,661,794 B1 | 12/2003 | Wolrich et al. |
| 6,667,920 B2 | 12/2003 | Wolrich et al. |
| 6,668,311 B2 | 12/2003 | Hooper et al. |
| 6,668,317 B1 | 12/2003 | Bernstein et al. |
| 6,681,300 B2 | 1/2004 | Wolrich et al. |
| 6,687,246 B1 | 2/2004 | Wolrich et al. |
| 6,694,380 B1 | 2/2004 | Wolrich et al. |
| 6,694,397 B2 | 2/2004 | Lackey et al. |
| 6,728,845 B2 | 4/2004 | Adiletta et al. |
| 6,738,068 B2 | 5/2004 | Cohen et al. |
| 6,738,831 B2 | 5/2004 | Wolrich et al. |
| 6,779,084 B2 | 8/2004 | Wolrich et al. |
| 6,782,472 B2 | 8/2004 | Jain et al. |
| 6,792,488 B2 | 9/2004 | Wolrich et al. |
| 6,819,201 B2 | 11/2004 | Jai |
| 6,823,438 B2 | 11/2004 | Hooper et al. |
| 6,829,056 B1 | 12/2004 | Barnes et al. |
| 6,851,011 B2 * | 2/2005 | Lin ................................ 711/4 |
| 7,146,457 B2 * | 12/2006 | Simha et al. ............... 711/108 |
| 2001/0051948 A1 | 12/2001 | Srinivisan et al. |
| 2002/0006050 A1 | 1/2002 | Jain |
| 2002/0013861 A1 | 1/2002 | Adiletta et al. |
| 2002/0038403 A1 | 3/2002 | Wolrich et al. |
| 2002/0041520 A1 | 4/2002 | Wolrich et al. |
| 2002/0042150 A1 | 4/2002 | Prestegard et al. |
| 2002/0049603 A1 | 4/2002 | Mehra et al. |
| 2002/0049749 A1 | 4/2002 | Helgeson et al. |
| 2002/0053016 A1 | 5/2002 | Wolrich et al. |
| 2002/0053017 A1 | 5/2002 | Adiletta et al. |
| 2002/0055852 A1 | 5/2002 | Little et al. |
| 2002/0059559 A1 | 5/2002 | Reddy et al. |
| 2002/0069121 A1 | 6/2002 | Jain et al. |
| 2002/0073091 A1 | 6/2002 | Jain et al. |
| 2002/0081714 A1 | 6/2002 | Jain et al. |
| 2002/0085008 A1 | 7/2002 | Jain et al. |
| 2002/0087862 A1 | 7/2002 | Jain et al. |
| 2002/0091710 A1 | 7/2002 | Dunham et al. |
| 2002/0106085 A1 | 8/2002 | Jain et al. |
| 2002/0106845 A1 | 8/2002 | Chao et al. |
| 2002/0107811 A1 | 8/2002 | Jain et al. |
| 2002/0111731 A1 | 8/2002 | Jain et al. |
| 2002/0123749 A1 | 9/2002 | Jain |
| 2002/0126621 A1 | 9/2002 | Johnson et al. |
| 2002/0143665 A1 | 10/2002 | Santos et al. |
| 2002/0144039 A1 | 10/2002 | Lackey et al. |
| 2002/0154610 A1 | 10/2002 | Tiedemann et al. |
| 2002/0161889 A1 | 10/2002 | Gamache et al. |
| 2002/0167834 A1 | 11/2002 | Jain |
| 2002/0167835 A1 | 11/2002 | Jain |
| 2002/0167836 A1 | 11/2002 | Jain |
| 2002/0167837 A1 | 11/2002 | Jain |
| 2002/0167845 A1 | 11/2002 | Jain |
| 2002/0169445 A1 | 11/2002 | Jain et al. |
| 2002/0172210 A1 | 11/2002 | Wolrich et al. |
| 2002/0176290 A1 | 11/2002 | Jain |
| 2002/0178229 A1 | 11/2002 | Sinha et al. |
| 2002/0184352 A1 | 12/2002 | Jain et al. |
| 2002/0186657 A1 | 12/2002 | Jain et al. |
| 2002/0188884 A1 | 12/2002 | Jain et al. |
| 2002/0193118 A1 | 12/2002 | Jain et al. |
| 2002/0194560 A1 | 12/2002 | Jain et al. |
| 2003/0004688 A1 | 1/2003 | Gupta et al. |
| 2003/0004689 A1 | 1/2003 | Gupta et al. |
| 2003/0004720 A1 | 1/2003 | Garudadri et al. |
| 2003/0009699 A1 | 1/2003 | Gupta et al. |
| 2003/0014662 A1 | 1/2003 | Gupta et al. |
| 2003/0018677 A1 | 1/2003 | Mathur et al. |
| 2003/0028578 A1 | 2/2003 | Jain et al. |
| 2003/0041082 A1 | 2/2003 | Dibrino |
| 2003/0041099 A1 | 2/2003 | Kishore et al. |
| 2003/0041216 A1 | 2/2003 | Rosenbluth et al. |
| 2003/0041228 A1 | 2/2003 | Rosenbluth et al. |
| 2003/0046044 A1 | 3/2003 | Jain et al. |
| 2003/0046488 A1 | 3/2003 | Rosenbluth et al. |
| 2003/0051073 A1 | 3/2003 | Mishra et al. |
| 2003/0055829 A1 | 3/2003 | Kambo et al. |
| 2003/0056055 A1 | 3/2003 | Hooper et al. |
| 2003/0063517 A1 | 4/2003 | Jain |
| 2003/0065366 A1 | 4/2003 | Merritt et al. |
| 2003/0065785 A1 | 4/2003 | Jain |
| 2003/0079040 A1 | 4/2003 | Jain et al. |
| 2003/0081582 A1 | 5/2003 | Jain et al. |
| 2003/0101361 A1 | 5/2003 | Jain et al. |
| 2003/0101438 A1 | 5/2003 | Mishra et al. |
| 2003/0105899 A1 | 6/2003 | Rosenbluth et al. |
| 2003/0105901 A1 | 6/2003 | Wolrich et al. |
| 2003/0110166 A1 | 6/2003 | Wolrich et al. |
| 2003/0110322 A1 * | 6/2003 | Wolrich et al. ............... 710/5 |
| 2003/0110458 A1 | 6/2003 | Jain et al. |
| 2003/0115317 A1 | 6/2003 | Hickson et al. |
| 2003/0115347 A1 | 6/2003 | Wolrich et al. |
| 2003/0115426 A1 * | 6/2003 | Rosenbluth et al. ......... 711/154 |
| 2003/0120473 A1 | 6/2003 | Jain et al. |
| 2003/0120884 A1 | 6/2003 | Koob et al. |
| 2003/0131022 A1 | 7/2003 | Wolrich et al. |
| 2003/0131198 A1 | 7/2003 | Wolrich et al. |
| 2003/0131204 A1 * | 7/2003 | Lin et al. ..................... 711/152 |
| 2003/0135351 A1 | 7/2003 | Wilkinson et al. |
| 2003/0140196 A1 * | 7/2003 | Wolrich et al. ............... 711/118 |
| 2003/0144858 A1 | 7/2003 | Jain et al. |
| 2003/0145155 A1 | 7/2003 | Wolrich et al. |
| 2003/0145159 A1 | 7/2003 | Adiletta et al. |
| 2003/0145173 A1 | 7/2003 | Wilkinson et al. |
| 2003/0147409 A1 | 8/2003 | Wolrich et al. |
| 2003/0150998 A1 | 8/2003 | Shin et al. |
| 2003/0172313 A1 | 9/2003 | Jain et al. |
| 2003/0191866 A1 | 10/2003 | Wolrich et al. |
| 2003/0191988 A1 | 10/2003 | Daial et al. |
| 2003/0193936 A1 | 10/2003 | Wolrich et al. |
| 2003/0196012 A1 | 10/2003 | Wolrich et al. |
| 2003/0204394 A1 | 10/2003 | Garudadri et al. |
| 2003/0204665 A1 | 10/2003 | Jain et al. |
| 2003/0210574 A1 | 11/2003 | Wolrich et al. |
| 2003/0212619 A1 | 11/2003 | Jain et al. |
| 2003/0212852 A1 | 11/2003 | Wolrich et al. |
| 2003/0219984 A1 | 11/2003 | Ying et al. |
| 2003/0224811 A1 | 12/2003 | Jain et al. |
| 2003/0225965 A1 * | 12/2003 | Krishnan ..................... 711/108 |
| 2003/0233494 A1 | 12/2003 | Ghosh et al. |
| 2003/0235189 A1 | 12/2003 | Mathew et al. |
| 2004/0004970 A1 | 1/2004 | Lakshmanamurthy et al. |
| 2004/0004972 A1 | 1/2004 | Lakshmanamurthy et al. |
| 2004/0010791 A1 | 1/2004 | Jain et al. |
| 2004/0012459 A1 | 1/2004 | Jain |
| 2004/0032414 A1 | 2/2004 | Jain et al. |
| 2004/0034743 A1 | 2/2004 | Wolrich et al. |
| 2004/0039424 A1 | 2/2004 | Merritt et al. |

| | | |
|---|---|---|
| 2004/0039895 A1 | 2/2004 | Wolrich et al. |
| 2004/0054880 A1 | 3/2004 | Bernstein et al. |
| 2004/0068614 A1 | 4/2004 | Rosenbluth et al. |
| 2004/0071152 A1 | 4/2004 | Wolrich et al. |
| 2004/0072563 A1 | 4/2004 | Holcman et al. |
| 2004/0073728 A1 | 4/2004 | Wolrich et al. |
| 2004/0073778 A1 | 4/2004 | Adiletta et al. |
| 2004/0073893 A1 | 4/2004 | Rajaram et al. |
| 2004/0078643 A1 | 4/2004 | Ghosh et al. |
| 2004/0081229 A1 | 4/2004 | Narayan et al. |
| 2004/0085901 A1 | 5/2004 | Hooper et al. |
| 2004/0093261 A1 | 5/2004 | Jain et al. |
| 2004/0093571 A1 | 5/2004 | Jain et al. |
| 2004/0093602 A1 | 5/2004 | Huston et al. |
| 2004/0098433 A1 | 5/2004 | Narayan et al. |
| 2004/0098496 A1 | 5/2004 | Wolrich et al. |
| 2004/0109369 A1 | 6/2004 | Wolrich et al. |
| 2004/0117239 A1 | 6/2004 | Mittal et al. |
| 2004/0117791 A1 | 6/2004 | Prasad et al. |
| 2004/0120359 A1 | 6/2004 | Frenzel et al. |
| 2004/0136445 A1 | 7/2004 | Olson et al. |
| 2004/0139290 A1 | 7/2004 | Wolrich et al. |
| 2004/0160290 A1 | 8/2004 | Jain et al. |
| 2004/0162083 A1 | 8/2004 | Chen et al. |
| 2004/0162933 A1 | 8/2004 | Adiletta et al. |
| 2004/0185868 A1 | 9/2004 | Jain et al. |
| 2004/0186921 A1 | 9/2004 | Wolrich et al. |
| 2004/0190906 A1 | 9/2004 | Jain |
| 2004/0199887 A1 | 10/2004 | Jain et al. |
| 2004/0203795 A1 | 10/2004 | Brusilovsky et al. |
| 2004/0203991 A1 | 10/2004 | Chen et al. |
| 2004/0205316 A1 | 10/2004 | Hooper et al. |
| 2004/0205569 A1 | 10/2004 | McCarty et al. |
| 2004/0205747 A1 | 10/2004 | Bernstein et al. |
| 2004/0221066 A1* | 11/2004 | Ganfield et al. ............. 709/250 |
| 2004/0224666 A1 | 11/2004 | Jain et al. |
| 2004/0224667 A1 | 11/2004 | Jain |
| 2004/0225907 A1 | 11/2004 | Jain et al. |
| 2004/0230680 A1 | 11/2004 | Jain et al. |
| 2004/0252686 A1 | 12/2004 | Hooper et al. |
| 2004/0252711 A1 | 12/2004 | Romano et al. |
| 2005/0010761 A1 | 1/2005 | Remedios et al. |
| 2005/0018601 A1 | 1/2005 | Kalkunte et al. |
| 2006/0090044 A1 | 4/2006 | Hillier et al. |
| 2006/0136659 A1 | 6/2006 | Jain et al. |
| 2006/0136681 A1* | 6/2006 | Jain et al. .................... 711/154 |

OTHER PUBLICATIONS

Tom Mainelli. "Are you ready for 64-bit PC?", Jul. 2003, http://www.pcworld.com/article/id,111508-page,1/article.html.*

"Intel IXP1200 Network Processor Family—The Foundation of a Total Development Environment for Next-Generation Networks", *Prodcut Brief*, (2001),1-4.

"Intel IXP2400 Network Processor—For OC-48/2.5 Gbps network access and edge applications", *Product Brief*, (2002),1-6.

"Intel IXP2850 Network Processor—High-speed, secure content processing in a single chip", *Product Brief*, (2002),1-6.

Adiletta, M., et al., "The next generation of Intel IXP Network Processors", *Intel Technology Journal, Network Processors*, 6 (3), (Aug. 15, 2002), 16-18.

Carlson, B., "Packets Challenge next-gen nets", *EETIMES*, http://www.eetimes.com/showArticle.jhtml;jsession, (2002).

Kumar, S., et al., "A Scalabel, Cache-Based Queue Management Subsystem for Network Processors", *Department of Computer Science and Engineering*, (Oct. 2004),1-7.

* cited by examiner

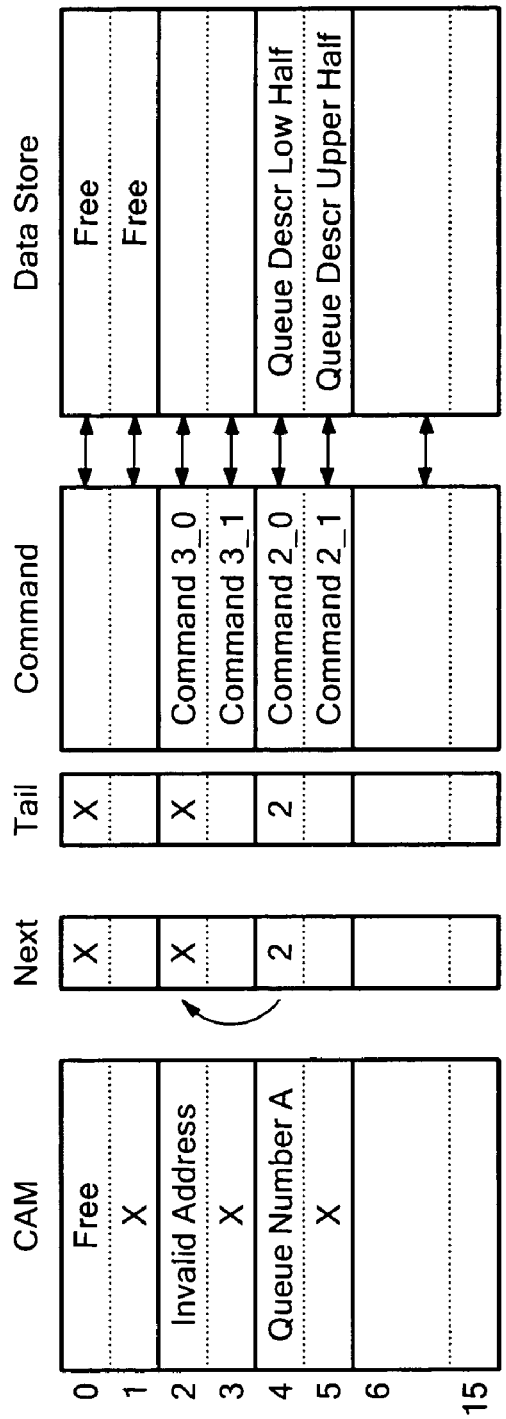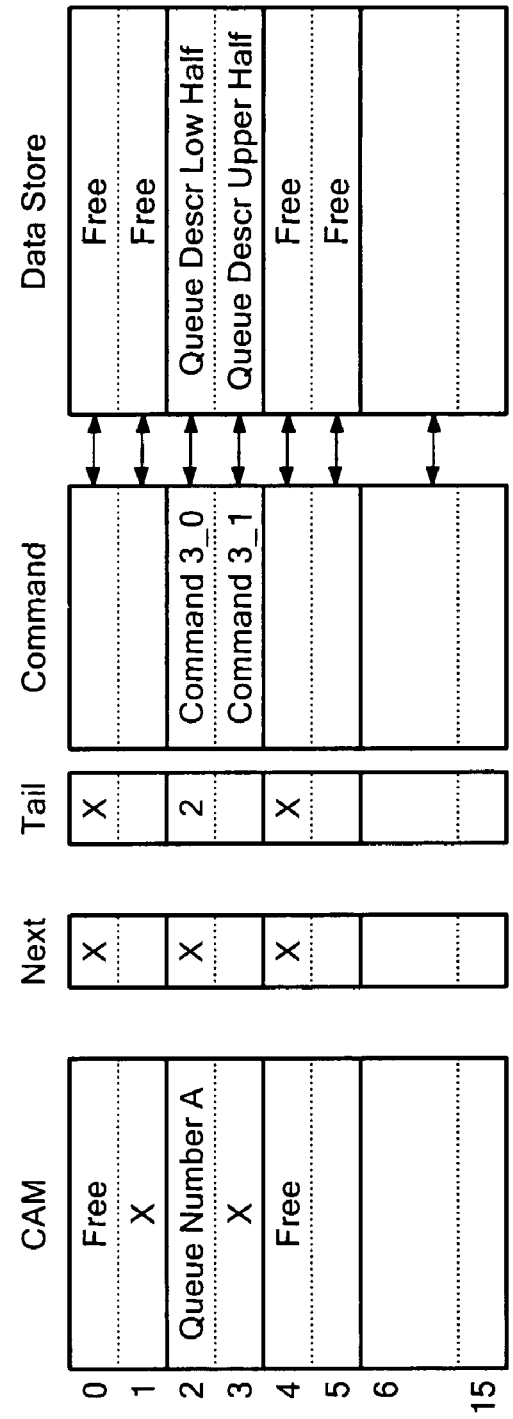
FIG. 12A
FIG. 12B

PROCESSOR HAVING CONTENT ADDRESSABLE MEMORY FOR BLOCK-BASED QUEUE STRUCTURES

CROSS REFERENCE TO RELATED APPLICATIONS

Not Applicable.

STATEMENT REGARDING FEDERALLY SPONSORED RESEARCH

Not Applicable.

BACKGROUND

As is known in the art, network devices, such as routers and switches, can include network processors to facilitate receiving and transmitting data. In certain network processors, such as IXP Network Processors by Intel Corporation, high-speed queuing and FIFO (First In First Out) structures are supported by a descriptor structure that utilizes pointers to memory. U.S. Patent Application Publication No. US 2003/0140196 A1 discloses exemplary queue control data structures. Packet descriptors that are addressed by pointer structures may be 32-bits or less, for example.

In one known configuration, queues are controlled by a queue descriptor data structure that includes a head pointer for the address of first element of the list and a tail pointer for the address of the last element of the list. Ring structures are controlled by an analogous ring descriptor data structure having a remove pointer and an insert pointer. Maintaining efficient access to the queue descriptors and ring descriptors is challenging when the number of queues/rings becomes relatively large (e.g., 500,000 to 1,000,000 queues/rings).

BRIEF DESCRIPTION OF THE DRAWINGS

The exemplary embodiments contained herein will be more fully understood from the following detailed description taken in conjunction with the accompanying drawings, in which:

FIGS. 12A-D is a schematic depicting showing an exemplary command storage and servicing sequence.

DETAILED DESCRIPTION

Figure 1:
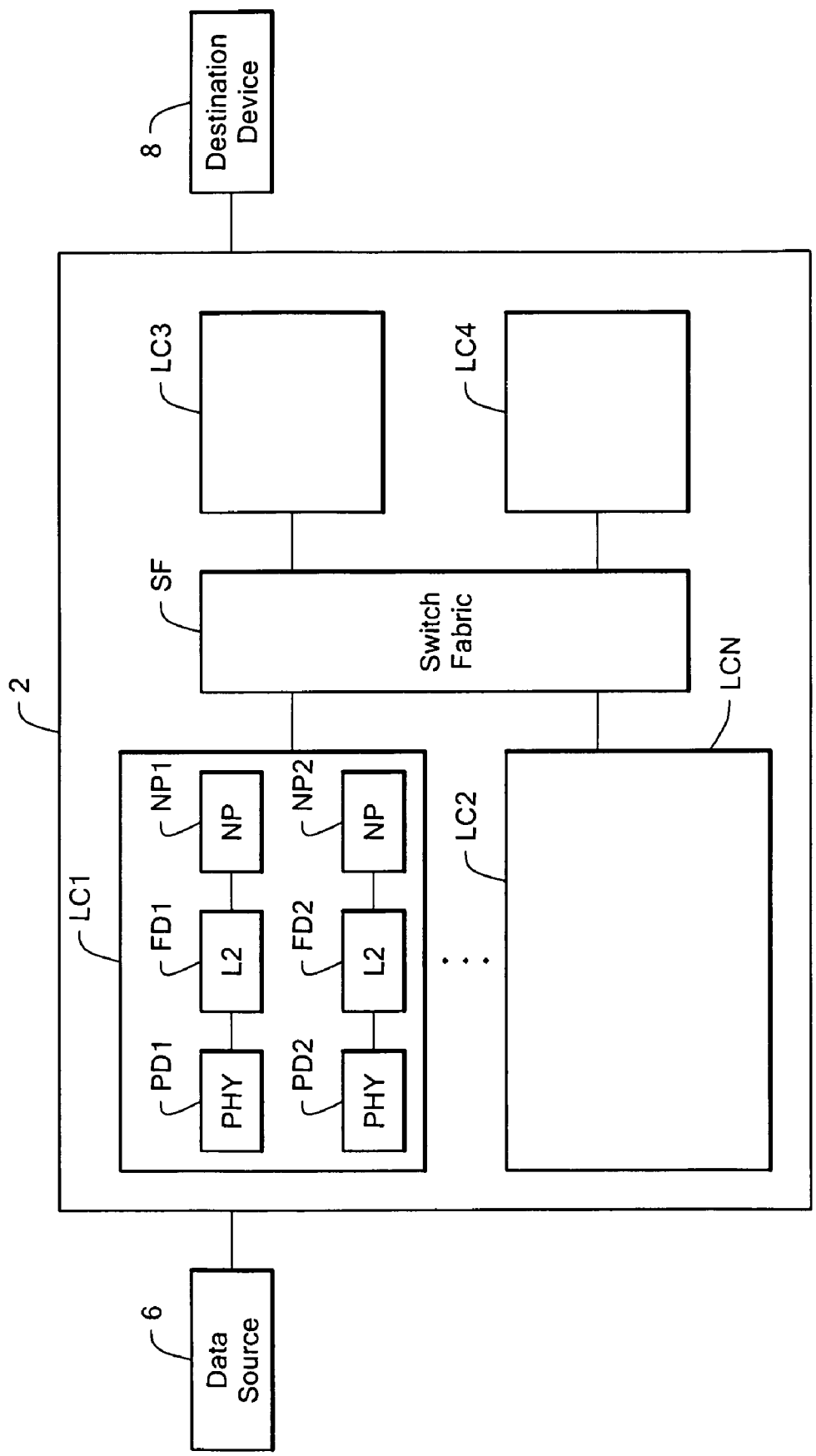
FIG. 1 is a diagram of an exemplary system including a network device having a network processor unit with a content addressable memory.

FIG. 1 shows an exemplary network device 2 including network processor units (NPUs) having a content addressable memory for block-based queue structures. The device 2 processes incoming packets from a data source 6 and transmits the processed data to a destination device 8. The network device 2 can include, for example, a router, a switch, and the like. The data source 6 and destination device 8 can include various network devices now known, or yet to be developed, that can be connected over a communication path, such as an optical path having a OC-192 line speed.

The illustrated network device 2 can manage queues and access memory as described in detail below. The device 2 features a collection of line cards LC1-LC4 ("blades") interconnected by a switch fabric SF (e.g., a crossbar or shared memory switch fabric). The switch fabric SF, for example, may conform to CSIX (Common Switch Interface) or other fabric technologies such as HyperTransport, Infiniband, PCI (Peripheral Component Interconnect), Packet-Over-SONET (Synchronous Optic Network), RapidIO, and/or UTOPIA (Universal Test and Operations PHY Interface for ATM).

Individual line cards (e.g., LC1) may include one or more physical layer (PHY) devices PD1, PD2 (e.g., optic, wire, and wireless PHYs) that handle communication over network connections. The PHYs PD translate between the physical signals carried by different network mediums and the bits (e.g., "0"-s and "1"-s) used by digital systems. The line cards LC may also include framer devices (e.g., Ethernet, Synchronous Optic Network (SONET), High-Level Data Link (HDLC) framers or other "layer 2" devices) FD1, FD2 that can perform operations on frames such as error detection and/or correction. The line cards LC shown may also include one or more network processors NP1, NP2 that perform packet processing operations for packets received via the PHY(s) and direct the packets, via the switch fabric SF, to a line card LC providing an egress interface to forward the packet. Potentially, the network processor(s) NP may perform "layer 2" duties instead of the framer devices FD.

Figure 2:
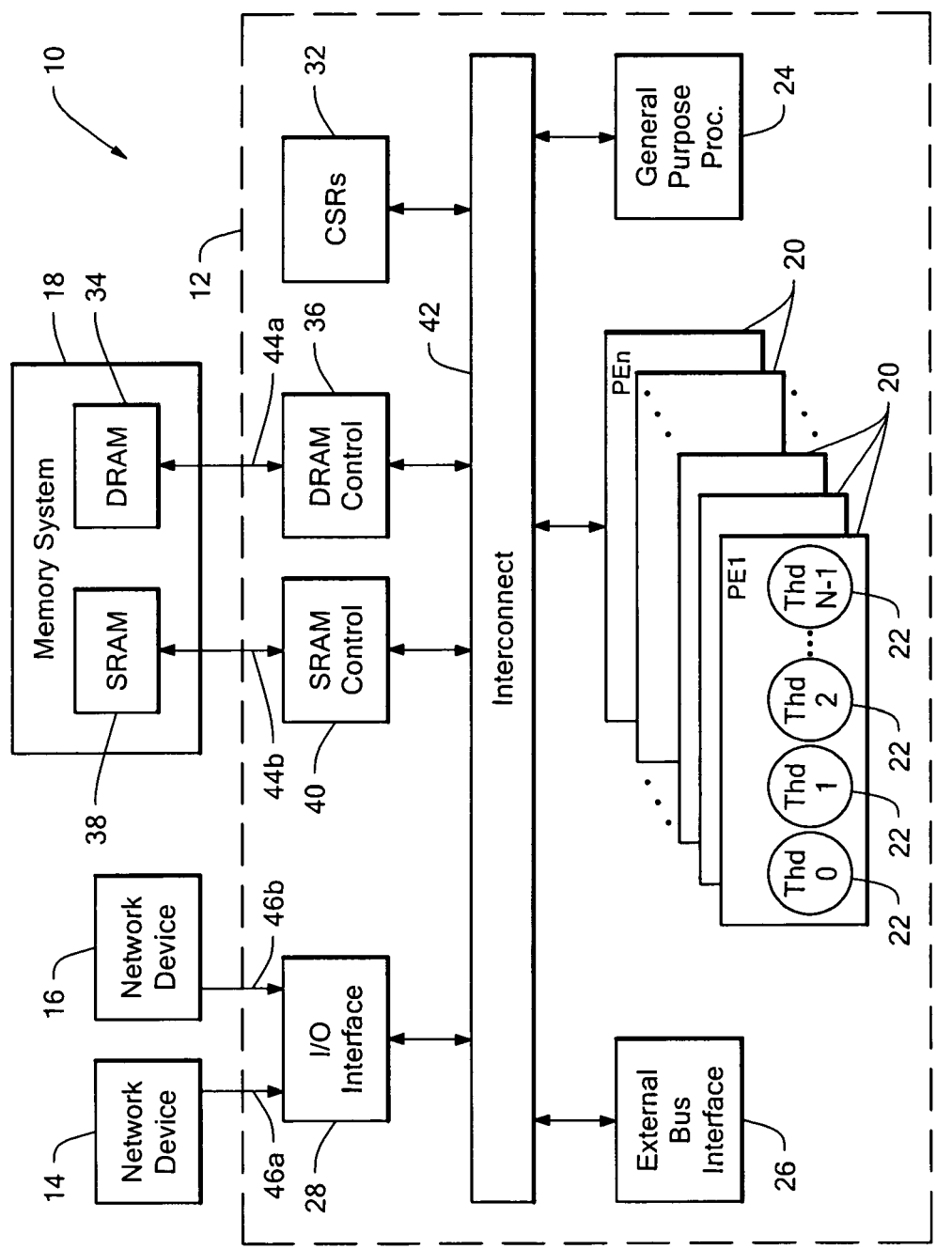
FIG. 2 is a diagram of an exemplary network processor having processing elements supporting a content addressable memory.

FIG. 2 shows an exemplary system 10 including a processor 12, which can be provided as a network processor. The processor 12 is coupled to one or more I/O devices, for example, network devices 14 and 16, as well as a memory system 18. The processor 12 includes multiple processors ("processing engines" or "PEs") 20, each with multiple hardware controlled execution threads 22. In the example shown, there are "n" processing elements 20, and each of the processing elements 20 is capable of processing multiple threads 22, as will be described more fully below. In the described embodiment, the maximum number "N" of threads supported by the hardware is eight. Each of the processing elements 20 is connected to and can communicate with adjacent processing elements.

In one embodiment, the processor 12 also includes a general-purpose processor 24 that assists in loading microcode control for the processing elements 20 and other resources of the processor 12, and performs other computer type functions such as handling protocols and exceptions. In network processing applications, the processor 24 can also provide support for higher layer network processing tasks that cannot be handled by the processing elements 20.

The processing elements 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC (Media Access Control) devices, e.g., for connecting to 10/100BaseT Ethernet, Gigabit Ethernet, ATM (Asynchronous Transfer Mode) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 3:
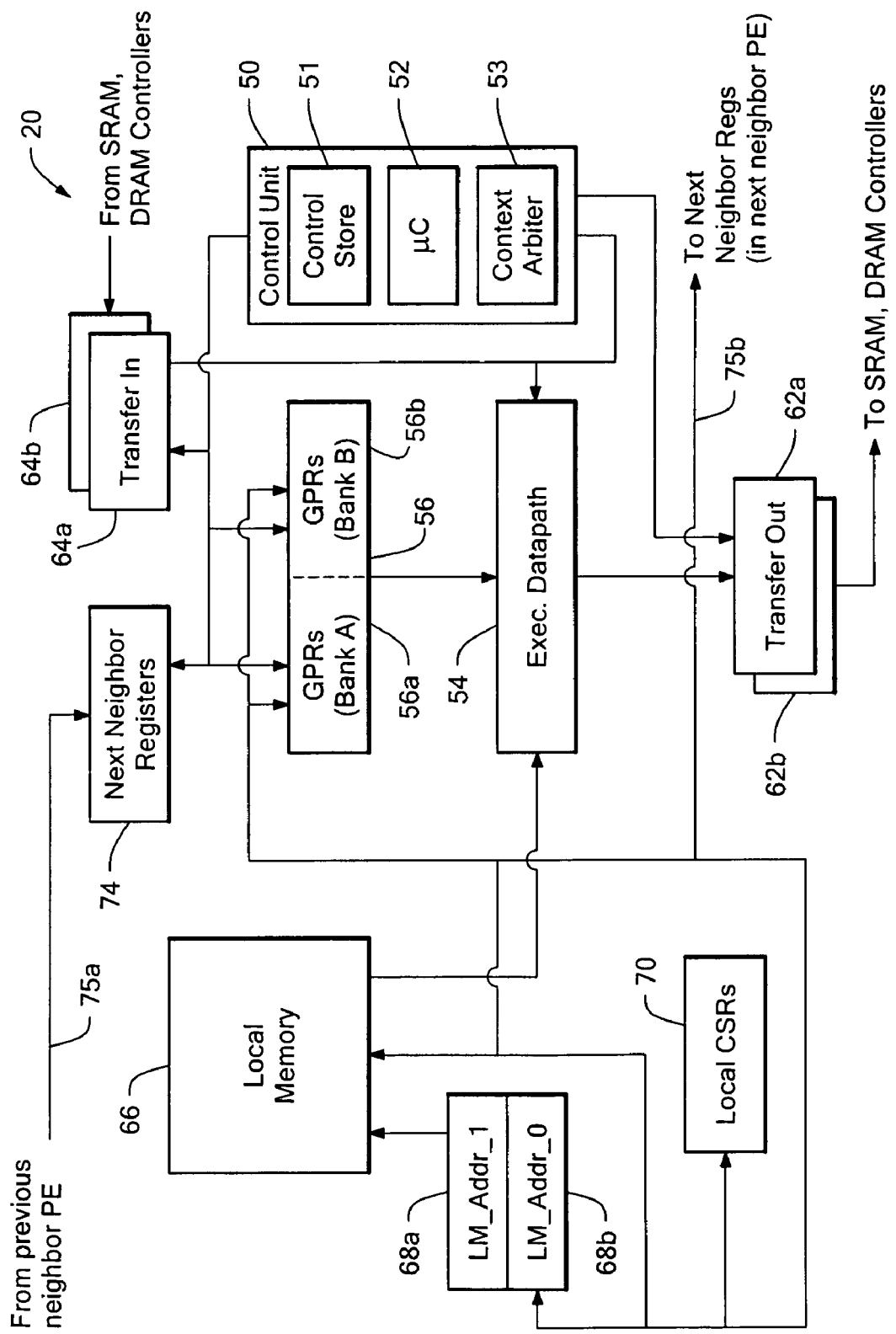
FIG. 3 is a diagram of an exemplary processing element (PE) that runs microcode.

Referring to FIG. 3, an exemplary one of the processing elements 20 is shown. The processing element (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing element's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU (arithmetic logic unit), a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing element. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the processing element 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68a ("LM_Addr_1"), 68b ("LM_Addr_0"), which supplies operands to the datapath 54, and receives results from the datapath 54 as a destination.

The PE 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the processing element as well.

Other register types of the PE 20 include next neighbor (NN) registers 74, coupled to the control store 50 and the execution datapath 54, for storing information received from a previous neighbor PE ("upstream PE") in pipeline processing over a next neighbor input signal 76a, or from the same PE, as controlled by information in the local CSRs 70. A next neighbor output signal 76b to a next neighbor PE ("downstream PE") in a processing pipeline can be provided under the control of the local CSRs 70. Thus, a thread on any PE can signal a thread on the next PE via the next neighbor signaling.

While illustrative hardware is shown and described herein in some detail, it is understood that the exemplary embodiments shown and described herein for a content addressable memory with a linked list pending queue to order memory commands are applicable to a variety of hardware, processors, architectures, devices, development systems/tools and the like.

In accordance with exemplary embodiments, a mechanism to order memory read and write commands includes a content addressable memory (CAM) and linked list pending queue to maximize memory channel bandwidth. In general, head of the line command blocking is reduced or eliminated with the use of a CAM and associated linked link logic.

Figure 4:
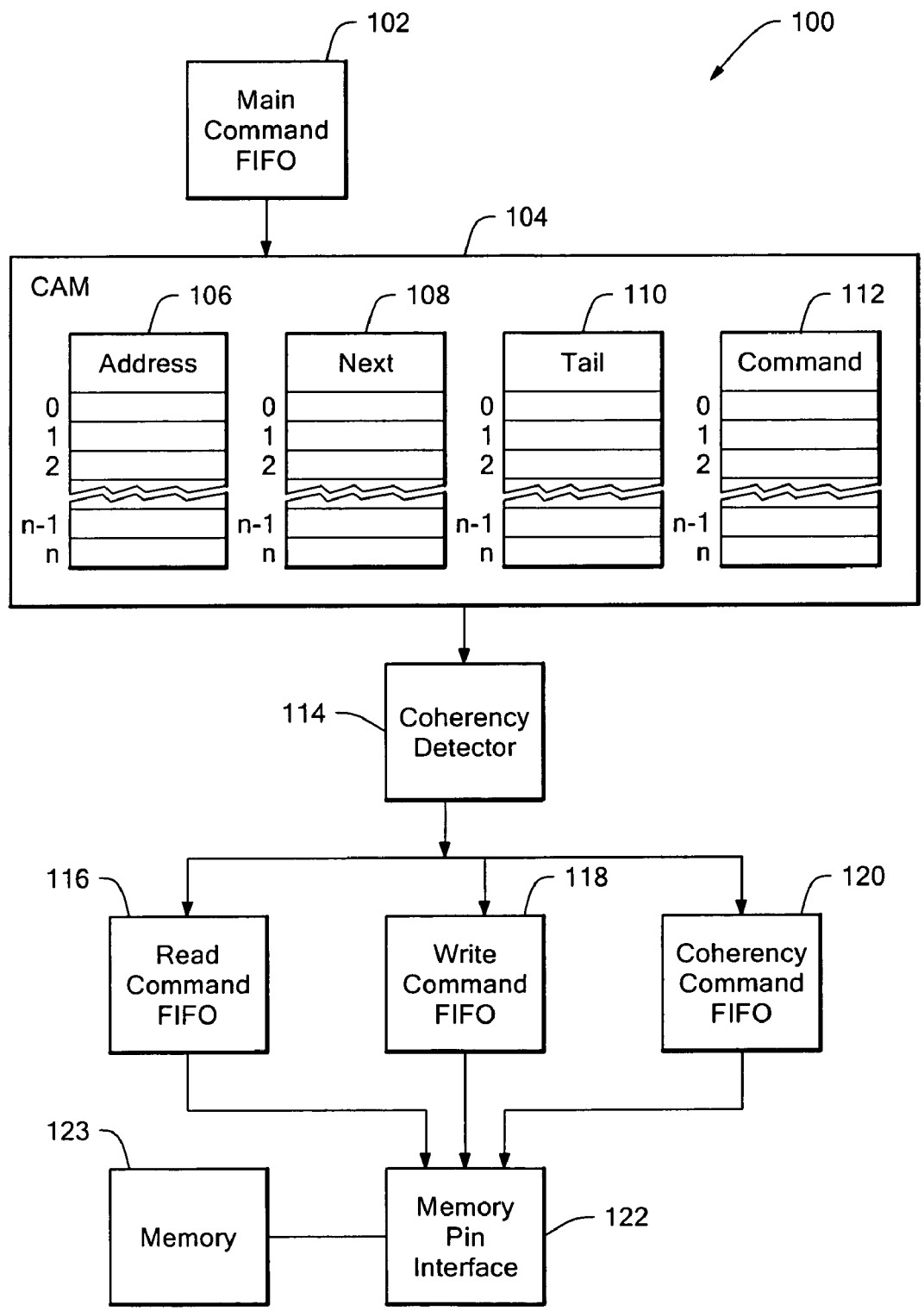
FIG. 4 is a diagram showing an exemplary command queuing implementation.

FIG. 4 shows an exemplary command storage configuration 100 including a main command FIFO 102 coupled to a CAM structure 104. In an exemplary embodiment, the CAM structure 104 includes an address or tag field 106, a next pointer field 108, a tail pointer field 110, and a command storage field 112. The CAM structure 104 is coupled to a coherency detector 114 that transmits commands to one of a read command FIFO 116, a write command FIFO 118, and a coherency command FIFO 120. These FIFOs interact with a memory pin interface 122 to effect memory operations in a memory 123. The pin interface 122 maximizes access to the memory banks by keeping track of what memory banks are available since an access to a given memory bank may make the bank unavailable for the next cycle or several cycles. Accesses to the various memory banks should be distributed in time to maximize memory access efficiency. The attached memory can be a QDRII or QDRIII (quad data rate) type of memories that have separate pins for address and data for different read and write operations or FCRAM (Fast Cycle Random Access Memory) type of memories which have shared read and write data pins but separate address pins.

When a RMW command is received by the main command FIFO 102 the address of the memory operation is stored in the CAM address field 104. The constituent read operation of the RMW command is launched to the pin interface 122. If, in the meantime, another command (e.g., read/write/RMW) is received that involves the same address, the command is stored in the CAM structure 104 by finding a free entry, invalidating it, and using its associated command storage field 112 to store the new command and connect it to the tail of linked list already attached to the entry associated with the CAM hit.

A received command that "hits" (e.g., matches an address in the CAM address field 106) in the CAM 104 or needs to use the CAM because of "read followed by write operation" uses a CAM entry. In one particular embodiment, all RMW commands are placed in the CAM 104 as well as commands that "hit" the cache due to an address match in the address field 106. For each CAM entry, the command is stored in the command storage field 112. A next descriptor field 108 and a tail descriptor field 110 are used to manage a linked list structure. The next field 108 points to the next entry in the link and the tail field 110 points to the last entry in the link. After data is returned by the pin interface 122, the linked list in the CAM 104 is processed with pending memory commands executed according to the command stored in the command storage 112.

In general, the coherency detector 114 and coherency command FIFO 120 provide a fence for RMW commands and commands that generate CAM hits. More particularly, non-RMW commands, e.g., read/write commands, for which a CAM hit does not occur are placed in the read command FIFO 116 or write command FIFO 118 as appropriate. Commands that must wait for other commands are place in the coherency command FIFO 120 to wait until a related command is completed. For example, when a RMW command is received, the read command can be launched to the pin interface 122 while the associated RMW command waits in the CAM to wait completion of the read operation. Upon completion of the read operation, the associated RMW command is invoked and modified data based on the RMW command is written back to pin interface if no more commands exist in the link list. The write command goes into the write command FIFO 118. With this arrangement, normal read and write operations can still proceed while a RMW command is waiting for its read data.

Figure 5A:
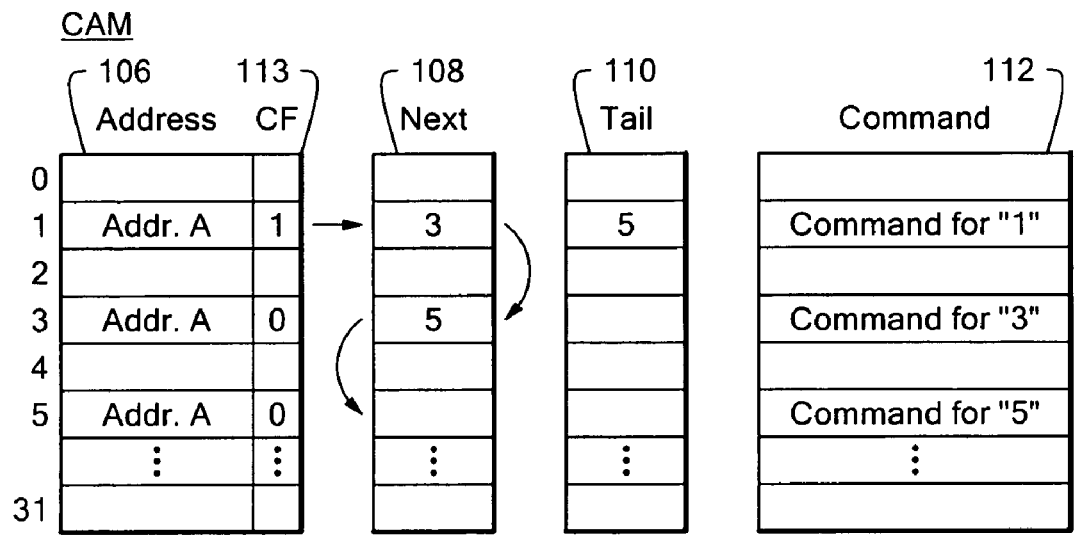
FIGS. 5A and 5B are pictorial representations of a CAM linked list structure.
Figure 5B:
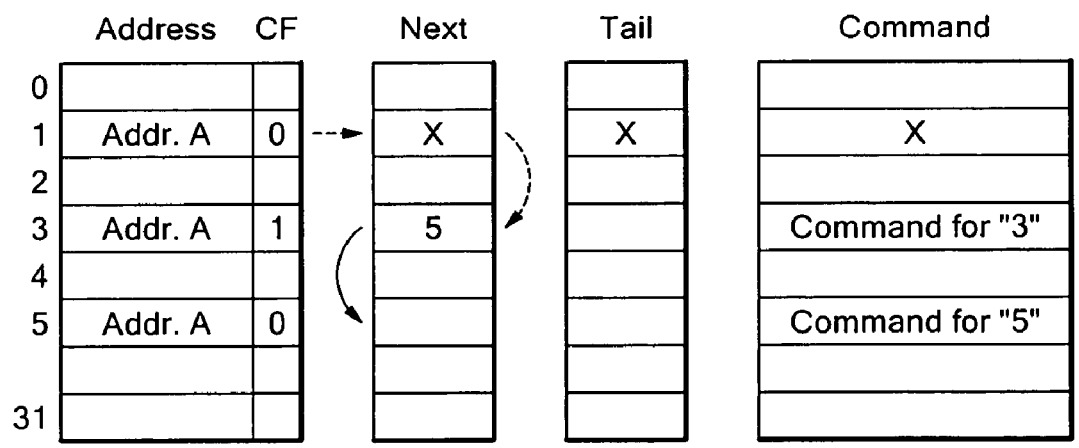

FIGS. 5A and 5B show an exemplary command processing sequence for the CAM structure 104 of FIG. 4, where like reference numbers indicate like elements. A first command is received for a RMW operation at address A. An empty location, e.g., location 1, in the CAM is found to store address A in the address field 106 and the first command is stored in the command field 112 for the CAM entry. The tail field 110 points to location 1 since there is only one command and the next field 108 is empty or don't care. When another command for address A is received there is a CAM hit. An available CAM entry, here shown as location 3, is found in which address A is stored. The next field 108 for CAM location 1 is updated to point to location 3 and the command is stored in the command field 112 for CAM location 3. The tail field 110 would also point to location 3.

Similarly, when the next operation for address A is received, another CAM hit occurs and a further available CAM location is identified, here shown as location 5. The command is stored in the command field 112 for CAM location 5. The tail field 110 for the first CAM location 1 is updated to reflect the last link as CAM location 5 and the next field 108 for CAM location 3 is updated to point to CAM location 5.

When processing the stored commands, initially a compare flag 113 is set for CAM location 1. This identifies CAM location 1 as the location containing the address to be checked against the address of new commands since the first command has not yet been processed. That is, the address in CAM location 1 is checked to determine CAM hits. After the first command has been processed, the compare flag 113 for the first CAM location 1 is cleared and the compare flag for CAM location 3 is set to indicate that location 3 should be used to determine CAM hits. Similarly, after the command for location 3 is processed, the compare flag 113 is cleared and the compare flag for CAM location 5 is set. Once this last command is processed, the compare flag 113 is cleared and no hits for address A will occur.

With this arrangement, processing is moved away from the pin interface 122 resulting in the collection of some commands in the link list. However, when the read/write operations of the first command in the link list complete, the remaining commands in the list can be serviced relatively quickly because the read data is already available. Read data can be kept in a temporary holding register for the time when pending operations on the same address A are completed.

Since coherency detection is performed again in the pin interface logic, there is no need to check for ordering requirements between "normal" reads and writes. In an exemplary embodiment, normal reads and writes are only tested with pending RMW operations and if there is no CAM hit, normal reads and writes proceed directly to the pin interface via the read and write FIFOS 116, 118 (FIG. 4).

While the exemplary embodiments are shown and described in conjunction with FIFOs, it is understood that other suitable queuing mechanisms will be readily apparent to one of ordinary skill in the art. It is further understood that a variety of CAM policies can be used of which least recently used (LRU) is but one example.

Figure 6:
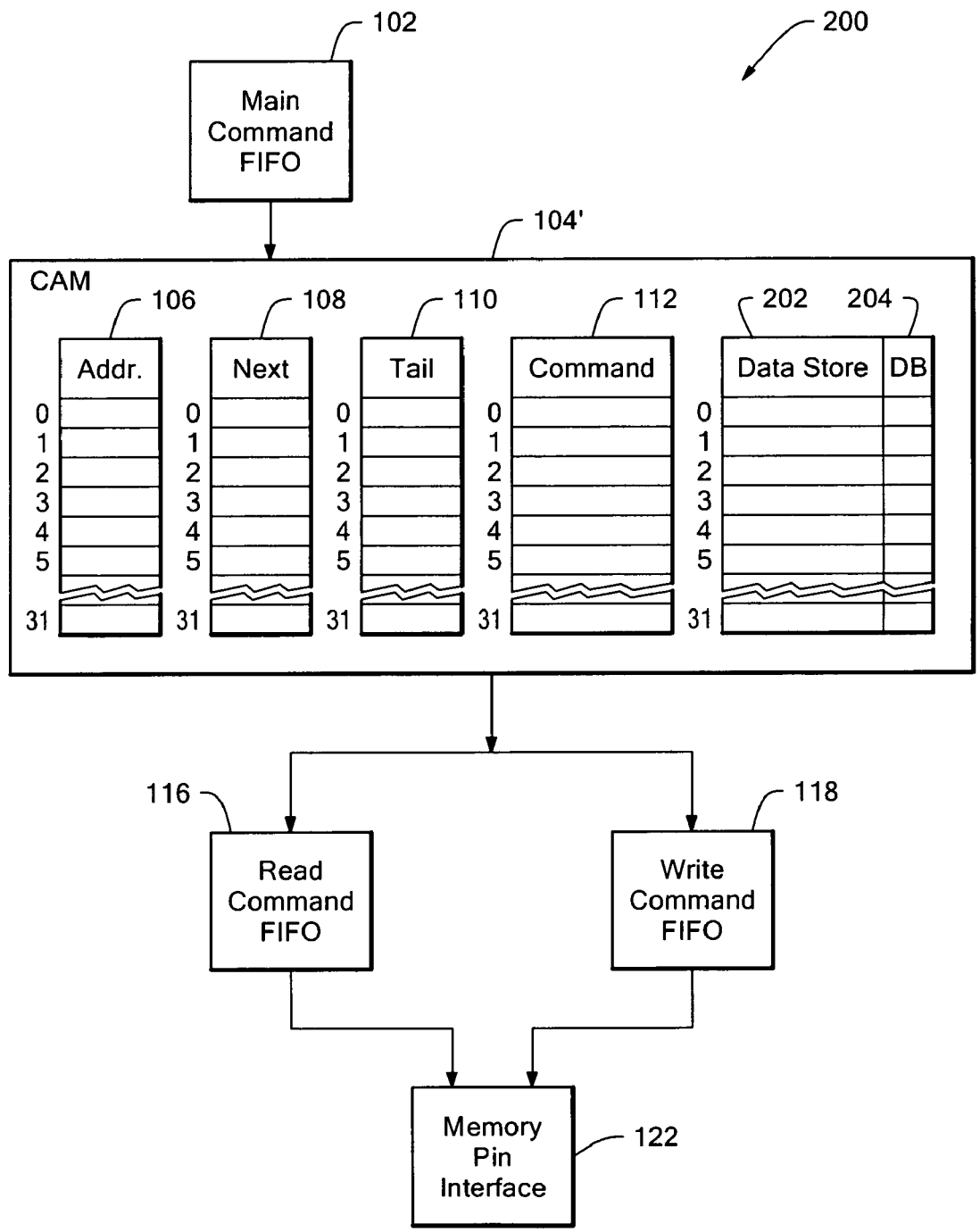
FIG. 6 is a block diagram of a command storage structure.

FIG. 6 shows an exemplary embodiment of a command storage configuration 200 including a CAM structure 104' in which coherency detection is removed from the pin interface 122 by including a data store with every CAM entry. This configuration 200 has some similarity with the configuration 100 of FIG. 4 in which like reference numbers indicate like elements. By including a data store field 202 in the configuration 200 of FIG. 6, the coherency detector 114 and FIFO 120 of FIG. 4 can be eliminated.

A read or write command at the head of the link list in the CAM 104' waits for an operation completed signal from pin interface logic 122 signaling that a write has completed or read data has been returned. After the operation completed signal is received, the pending commands for the same address can be serviced without requiring memory operations since the information resides in the data store field 202 of the CAM 104'. In one embodiment, where the last command is a write command the data should be written back to memory.

Assume a first command at the head of the queue is a write command, e.g., command AW, has been launched to the pin interface. Upon completion of the write operation, the pin interface generates a signal to indicate write completion. In the meantime, more commands for the same address BR (read), CW, DW, ER etc., are received. When the first write AW is completed, write data is still available in the data store field 202. For the second command BR, a read of the data just "written" can be serviced from the data store 202 without accessing the memory. The third command CW, a write to the same address, can also be serviced right away by replacing the data store field 202 with the CW data and setting a "dirty" bit 204 for the entry. It is understood that the "dirty" bit provides an indication of whether the write data has been written to memory. The fourth command DW, a write to the same location, can also be serviced right away by replacing the data store field 202 with the data for the fourth command DW. A fifth command ER, a read of the same location, can also be serviced right away using the data in the data store 202. If this is the last command in the CAM 104', based on the setting of the dirty bit, a write to memory is initiated. Upon receiving the write complete signal, the dirty bit 204 in the data store 202 is reset. If no more commands are pending on the same address, the CAM entry can be made eligible for replacement if more free entries are needed by CAM management.

It is understood that if the memory interface, such as QDR (quad data rate) SRAM, has separate read and write ports, then generic reads and writes should be ordered. The configuration of FIG. 6 can manage the coherency requirements for QDR memory operations. Alternatively, the configuration 100 of FIG. 4 can be used if coherency detection is performed in the pin interface logic.

It should be noted that if a CAM entry is never invalidated and maintains the last value locally (until a free CAM entry is needed to store a new command), then the CAM can also provide local caching so that a Read-Modify-Write operation for a 32-bit write on 64-bit accessible memory can be avoided. It is assumed that CAM management is defined such that an entry storing the 32-bit read command (with intention of 32-bit write back relatively soon) on 64-bit interface is made free only when no other type of CAM entry is available to store the newly received command needing the CAM entry. When the write for such an entry comes back and the entry is still valid, the data stored for the entry can be used to merge the received 32-bit data and written back as full 64-bit value as needed for a burst-of-4 memory interface.

In one particular embodiment, a queue control data structure can be used to provide efficient memory access when data structures have a size that is less than a minimum access for memory. For example, while control structures, such as queue descriptors may include 32 bits, the minimum memory access may be 64 bits. An exemplary queue descriptor structure supports blocks and residues that enable efficient queuing for 64-bit accesses for burst-of-4 SRAM and/or DRAM memory having a 16-bit interface, for example. In addition, error correcting codes (ECC) can be used efficiently.

In exemplary embodiments described herein, a queue data descriptor structure provides a residue mechanism that supports 32-bit data structures in 64-bit memory. The illustrated queue data descriptor eliminates the need for inefficient read-modify-write operations when providing lists of buffers that are accessed as 32-bit operands, when a minimum of 64-bits are read to or written from memory. Using only 64-bit read and write operations also allows ECC support.

While memory accesses are described in conjunction with 32-bit structures and a 64-bit memory access, it is understood that other embodiments include structure having different numbers of bits and memory accesses having larger minimum accesses. Other control structure embodiments and minimum accesses to meet the needs of a particular application will be readily apparent to one of ordinary skill in the art and within the scope of the presently disclosed embodiments.

Figures 7, 7A:
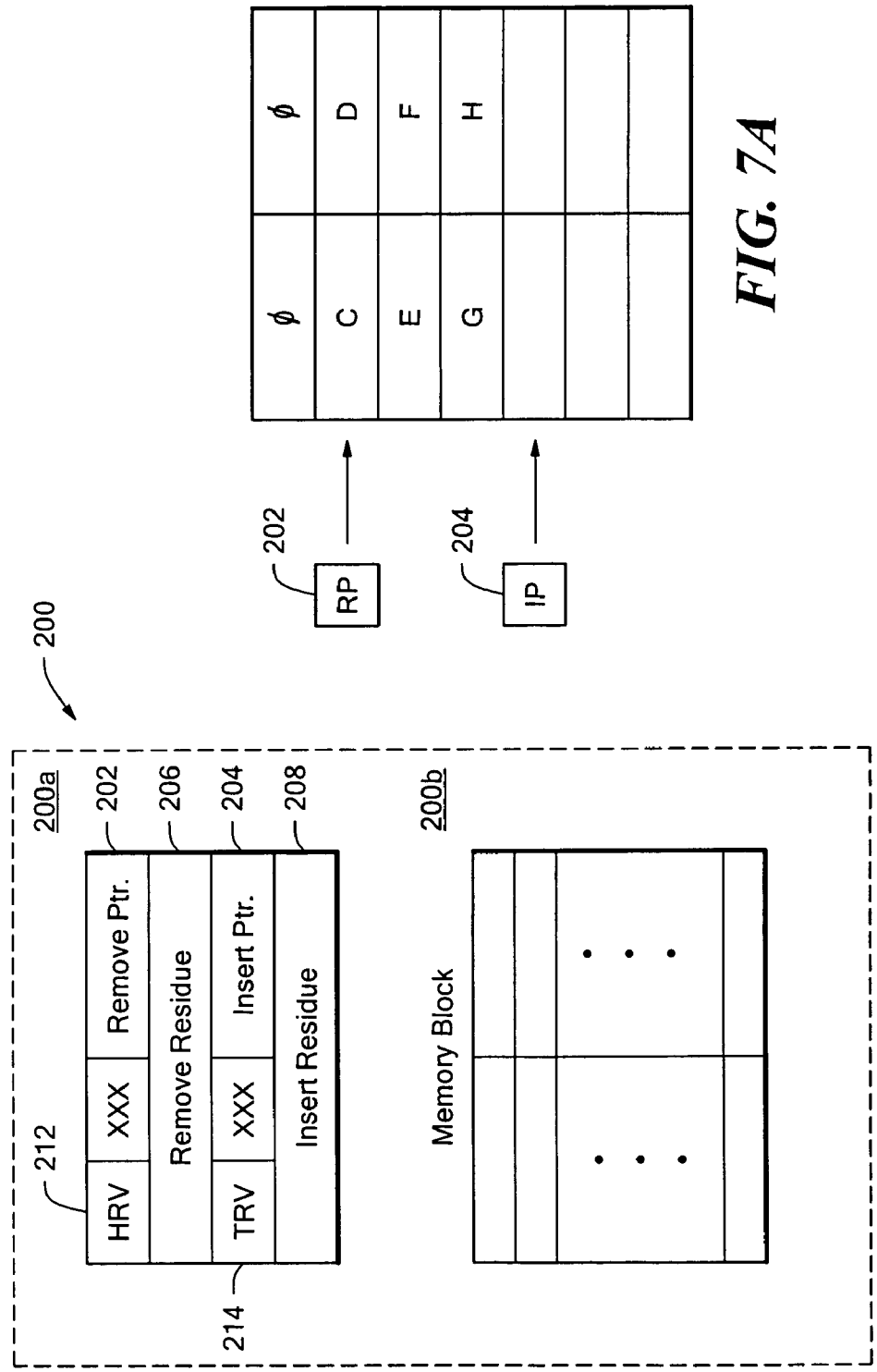
FIG. 7 is a diagram showing an exemplary queue descriptor structure.
FIG. 7A is a diagram showing an exemplary memory block.

FIG. 7 shows an exemplary queue descriptor 200 having a cache portion 200a and a memory block portion 200b. In an exemplary embodiment, the queue descriptor cache 200a is located onboard the processor and the memory block 200b is external memory. However, other implementations will be readily apparent to one of ordinary skill in the art. The cache 200a includes a remove pointer 202 and an insert pointer 204. The queue descriptor also includes a remove reside 206 and an insert residue 208. In one particular embodiment, the queue descriptor cache 200a structure includes 128 bits, 32 bits for each of the remove residue and the insert residue, and 24 bits for each of the remove pointer 202 and the insert pointer 204. The queue descriptor 200 can further include a head residue valid (HRV) value 212 and a tail residue valid value 214. The HRV value 212 and TRV value 214 indicate whether valid data is contained in the residue fields.

In general, the insert residue 208 and the remove residue 202 are used to cache the first of two 32-bit operands for an insert entry and the second of two 32-bit operands for a remove entry. As shown in FIG. 7A, the insert pointer 204 points to the next available address in the memory block to store data and the remove pointer 202 points to the address from which the next entries will be removed. When the memory block becomes empty, the block can be assigned to a pool of available memory blocks.

Figure 8:
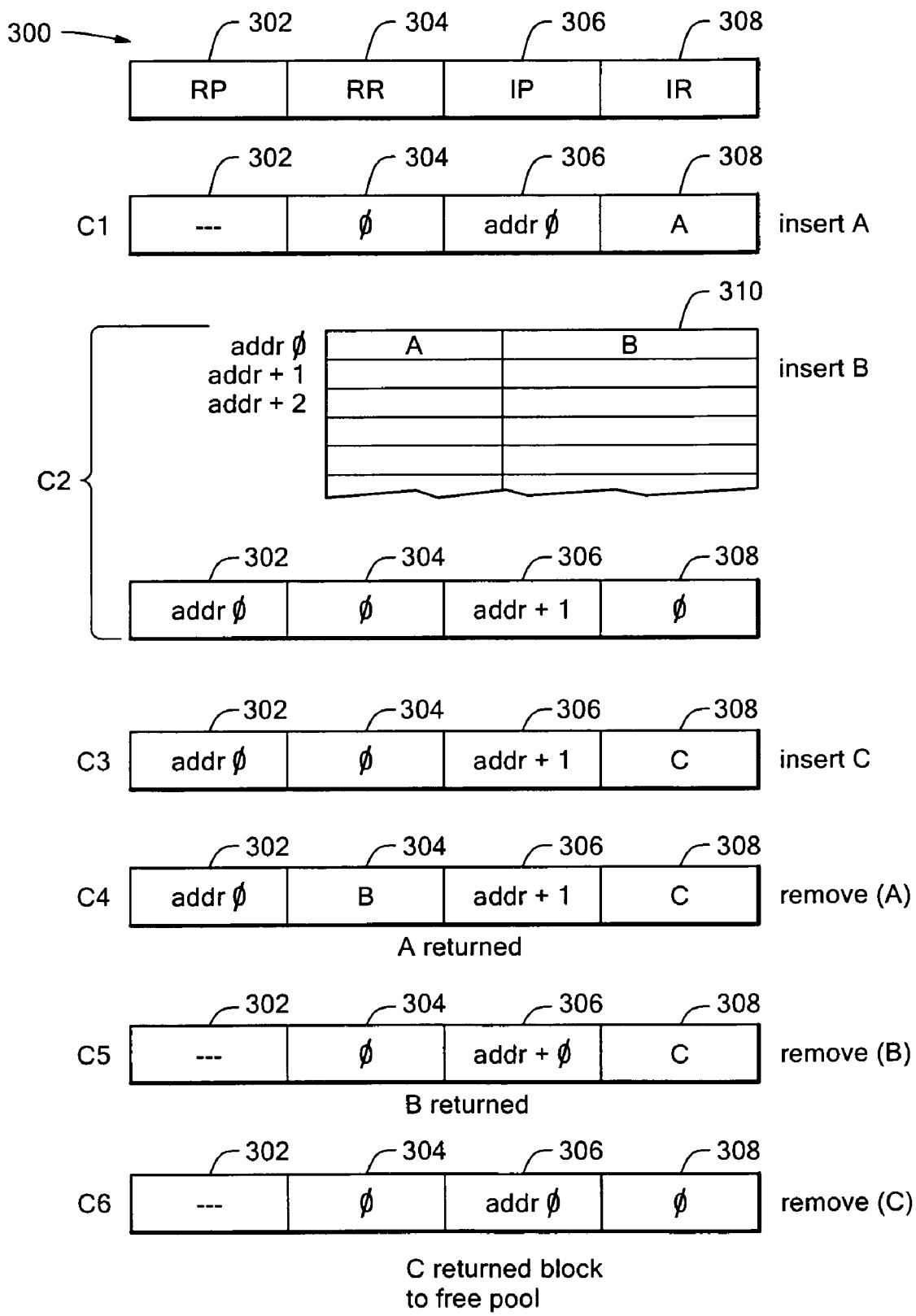
FIG. 8 is a diagram showing an exemplary queue descriptor as commands are received.

FIG. 8 shows an exemplary sequence of queue descriptor changes associated with inserting and removing packets. It is understood that only the residues and pointers are shown to more readily facilitate an understanding of the exemplary embodiments. A queue descriptor 300 includes a remove pointer 302, a remove residue 304, an insert pointer 306, and an insert residue 308. The queue descriptor initially describes a queue that is empty.

A first command C1 instructs insertion of a first packet into a queue so that a 32-bit value A is stored in the insert residue of the queue descriptor, which corresponds to a buffer descriptor pointing to a data buffer to store the packet data. This eliminates the need to write to a 64-bit minimum access for a 32-bit value for the first packet. A second command C2 instructs the insertion of a second packet (B) into the queue. At this point, a memory block 310 becomes active and the values A, B for the first and second packets are written to the first address addr0 of the queue descriptor memory block 310 in a 64-bit access. The insert pointer 306 now points to the next address addr+1 in the memory block and the residues 304, 308 are empty.

The next command C3 instructs the insertion of a third packet into the queue so that a value C for this packet is placed in the insert residue 308 of the queue descriptor 300. The pointers 302, 306 do not change. An insert packet D command would result in C and D being written to addr+1 and the insert pointer being incremented to addr+2 in the block.

In the next command C4, there is a remove command for the queue. As the first remove command after a write to the block, the remove pointer 302 points to the first memory address addr0, which contains A and B. Since the remove residue 304 is empty, a 64-bit memory access returns value A and stores value B in the remove residue 304 of the queue descriptor. A further remove command C5 returns value B from the remove residue 306 and the queue descriptor now reflects an empty queue and the block can be placed in the pool of free memory blocks.

A further remove command C6 causes packet C, which was cached in the insert residue 308, to be returned. In one embodiment, a count of the insert and/or remove residue is maintained to determine whether a value has been written to memory or not.

Based upon the status of the queue descriptor residues 304, 308, read/write accesses to the memory block 310 are 64-bits. In general, for insert instructions if the insert residue 308 is empty, the new entry is stored in the insert residue word 308 of the queue descriptor. If the insert residue 308 is not empty, 64-bits are written to the buffer block including the insert residue 308 and the new entry, and the insert pointer 306 is incremented to the next 64-bit aligned address.

For remove operations, if the remove residue 304 is empty, a 64-bit read of the buffer block, which can be provided as a FIFO, returns two entries. The first entry of the 64-bits aligned address is returned and the second entry is stored in the remove residue 304 word of the queue descriptor. If the remove residue 304 is not empty, no read of the FIFO structure is required since the desired entry is accessed from the remove residue 304 of the queue descriptor.

Figures 9, 10:
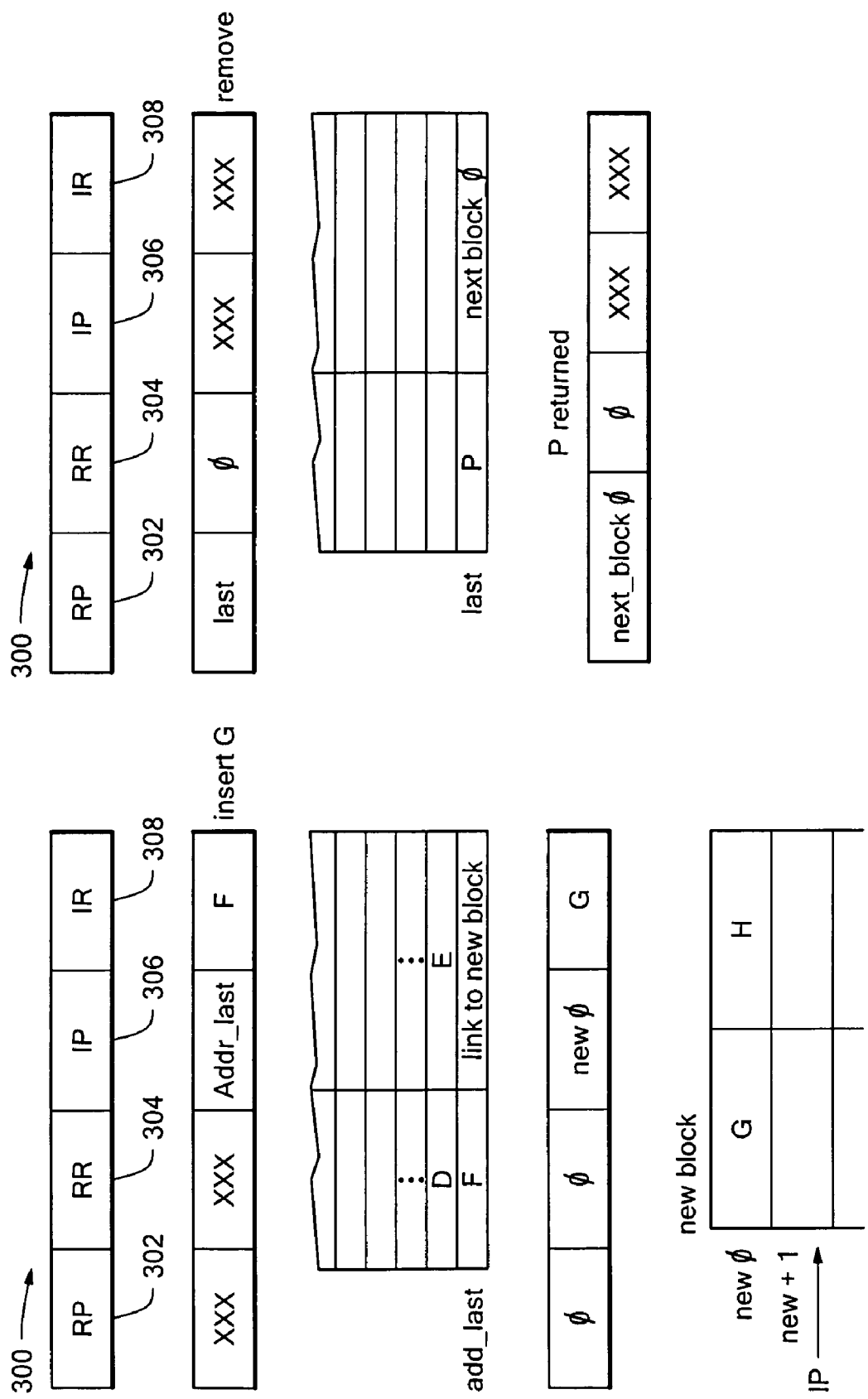
FIG. 9 is a diagram showing an exemplary queue descriptor pointing at a last block location for an insert command.
FIG. 10 is a diagram showing an exemplary queue descriptor pointing at a last block location for a remove command.

As shown in FIG. 9, when an insert operation is requested, such as insert packet G, and the insert pointer 306 is addressing the last 64-bit aligned location addr_last in a block where the insert residue 308 is not empty, the residue 308, here shown as F, (first 32 bits) and a link (second 32 bits) to a new block are written to the last 64-bit location of the present block. The new insert request G is stored in the insert residue 308. Upon receiving another insert command (e.g., insert H), the insert residue G and packet H are written to the first address new0 of the new block. The insert pointer 306 is then incremented to point to the next address new+1 in the new block.

As shown in FIG. 10, when a remove operation is requested and the remove pointer 302 of the queue descriptor 300 is addressing the last 64-bit aligned location of the block (and the remove residue 304 is empty), 64-bits are read with the first 32 bits being the remove entry P, which is returned, and the second 32 bits being the link next_block0 to the next block. The remove pointer 302 is updated with the new link next_block0.

In another aspect of the exemplary embodiments, a command storage configuration includes a CAM structure supporting data stores in multiple entries. When a queuing or other command is received, multiple CAM entries can be used if the data is larger than the data store field of a single entry.

Figure 11:
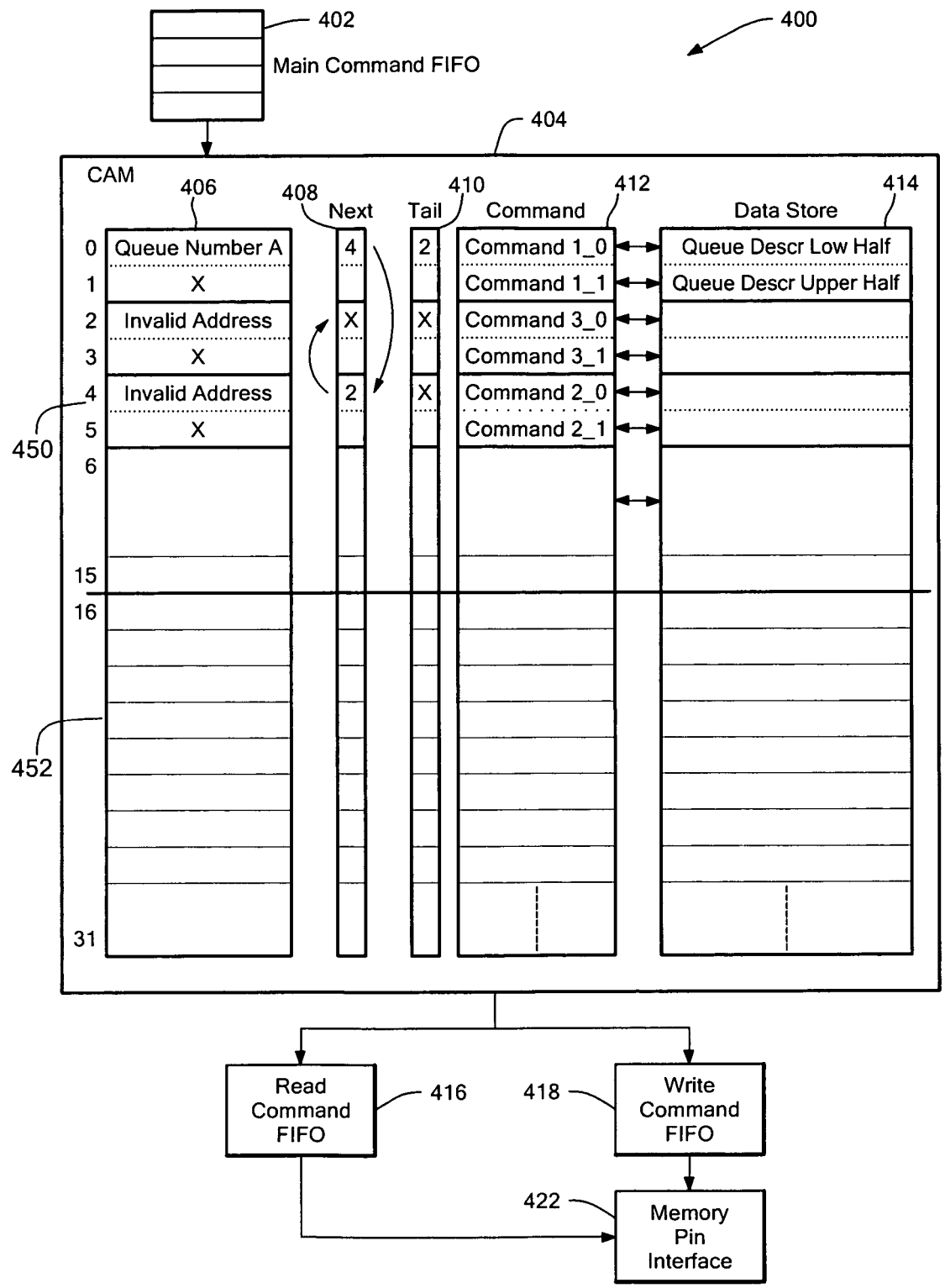
FIG. 11 is a schematic representation of a content addressable memory having multiple entries storing information for a command.

FIG. 11 shows an exemplary command storage structure 400 having certain features similar to the command storage structure of 200 of FIG. 6. A main command FIFO 402 sends commands to a CAM 404, which includes an address or tag field 406, a next pointer field 408, a tail pointer field 410, a command storage field 412, and a data store field 414. Commands from the CAM are sent to a read command FIFO 416 or write command FIFO 418 to execute memory operations via a memory pin interface 422, as described above.

When a queuing command (e.g., enqueue or dequeue) is received in the main command FIFO 402, the address field 406 of the CAM is examined to determine whether the corresponding queuing parameters are present in the CAM. If there is a CAM miss, a free CAM entry is selected and written with the queue number for the received enqueue and dequeue command.

A read of the queue descriptor from memory, typically external memory, is launched and then stored in the data store field 414 of the selected CAM entry. In an exemplary embodiment, since the queue descriptor is 16 Bytes, and the data store field 414 size is 8 Bytes per CAM entry, multiple CAM entries are used to service a single queuing command.

Still referring to FIG. 11, an exemplary link list build operation is shown when the following three queuing commands are received:

Command 1 (C1) is a relatively large multi-buffer enqueue command

Command 2 (C2) is a dequeue cell command

Command 3 (C3) is a relatively small single buffer enqueue command.

Initially the CAM 404 is empty. When the first command C1 is received, a CAM check is performed which results in a miss. Free CAM entries are found at locations 0 and 1. A read for the queue descriptor from external memory is then launched to obtain the data to be stored in the selected CAM entries. The queue number, shown as queue number A, is written to the CAM as a tag and the command is stored in the command store field 412. Since multiple entries are required due to the size of the command information, which can include a queue descriptor, a first portion (Command1_0) of the first command C1 is stored in the command store field 412 of location 0 and a second portion (command1_1) of the first command C1 is stored in the command field of location 1. A first portion of the data, such as the lower half of the queue descriptor, can be stored in the data store field 414 of location 0 and a second portion of the of the data store, such as the upper half of the queue descriptor, can be stored in the data store field of location 1 of the CAM.

In one particular embodiment, it may be preferred that adjacent CAM locations be used for "large" commands. In other embodiments, non-adjacent CAM locations can be used for multi-entry storage with additional link lists or other structures.

When a second command C2, which is a dequeue command, is received before the first command C1 for queue number A has been serviced, the second command C2 is linked behind the first command C1 by updating the next and tail fields 408, 410, as described above. A free CAM entry is found at locations 4 and 5 and queue number A is written in the tag field 406. The second command C2 is written to the command store fields 412 of locations 4 and 5 (Command2_0, Command2_1 as shown).

A third command C3, which is an enqueue command, is received by the queuing hardware before the first command C1 is serviced and is inserted in the link list structure in a similar manner at locations 2 and 3.

In an exemplary embodiment, the CAM 404 includes a first portion 450 in which multi-entry commands can be stored and a second portion 452 in which single entry commands can be stored. In one particular embodiment, the second portion 452 includes CAM entries having 8-12 bytes of command store capacity and 8 bytes of data store capacity.

With this arrangement, commands that need additional command store/data store capacity and commands that require single entry command/data store capacity can be serviced with the same CAM/linked list architecture. In the above-defined implementation, combining two CAM entries provides 16-24 bytes of command storage and 16 bytes of data storage.

In one embodiment, the apportionment of the CAM between the first and second regions 450, 452 is configurable. When queuing commands are present in the memory channel multi-entry CAM storage is used, and when queuing commands are not present in the channel, single entry CAM storage is used.

Multi-entry CAM storage can also be used for a single queuing command in block-based queuing where the enqueue parameters supplied by the processing element executing the enqueue command vary for single buffer packets and multi-buffer packets. It follows that the storage requirements for single and multi-packet buffers also varies. Thus, the CAM should be capable of storing the maximum size multi-buffer packet command.

The following defines the fields needed to define the maximum size multi-buffer packet enqueue command:
 Enqueue or Dequeue Command encoding and other control information
 Queue number
 First Buffer descriptor
 Subsequent block address for additional buffer descriptors
 Last buffer descriptor location in the subsequent block.
 A new block address The queue number is stored in the CAM tag field 406. The remaining parameters set forth above can be stored in one or more command store fields 404.

As shown and described above in FIG. 5A, each entry can include a compare flag to determine which CAM entries should be checked since only the first entry in the link list needs to examined for CAM hits. Other entries should have compare flags reset. It is understood that the queue number information can be present in each tag field 406 but is not checked unless the compare flag is set. As entries are removed from the link list, the compare flag is then set for the new first entry and the tag field information is used to check the CAM.

FIGS. 12A-12D show an illustrative series of CAM snapshots as the commands described in FIG. 11 are serviced. The first command C1 in the link list is serviced if all the operands needed to service this command are available. A maximum number of operands is needed for multi-buffer packet enqueue commands, which are defined above. If all of the operands are not available yet, the queue descriptor is stored in available data store. It will be serviced when all the operands become available. When this command is serviced, the link list is examined and the next command in the link list is serviced.

As shown in FIG. 12A, after the first command C1 in locations 0 and 1 is serviced, its corresponding CAM entries are made free and compare flag reset. The next entry in the link list, which contains the second command C2 at locations 4 and 5, has its compare flag set. If all the parameters required for this command are not available, the queue descriptor from the previous command is copied into the data store fields at locations 4 and 5. The second command C2 is serviced when all the parameters for the command are available as shown in FIG. 12B. Since the second command C2 is a dequeue command, it can be serviced right away from the queue descriptor information. If a residue is present, it is dequeued and sent to the requesting processing element as described above. If there is no residue, a read of the buffer descriptor is launched and a look ahead of the next command in the link list is performed.

It should be noted that if the next command was a dequeue command, it would be serviced from the previous buffer descriptor read since buffer descriptor reads return two 32-bit buffer descriptors in an exemplary embodiment. If the next command was an enqueue command, it would be checked to determine if it can be serviced without violating the ordering requirement for enqueue and dequeue. If the ordering is not violated, the next enqueue can be serviced right away.

It is clear from the above that multiple commands from the link list can be serviced if ordering rules are satisfied thereby making it possible to hide memory latency. This is possible since memory reads for multiple queuing operations can be performed in parallel.

Figure 12C:
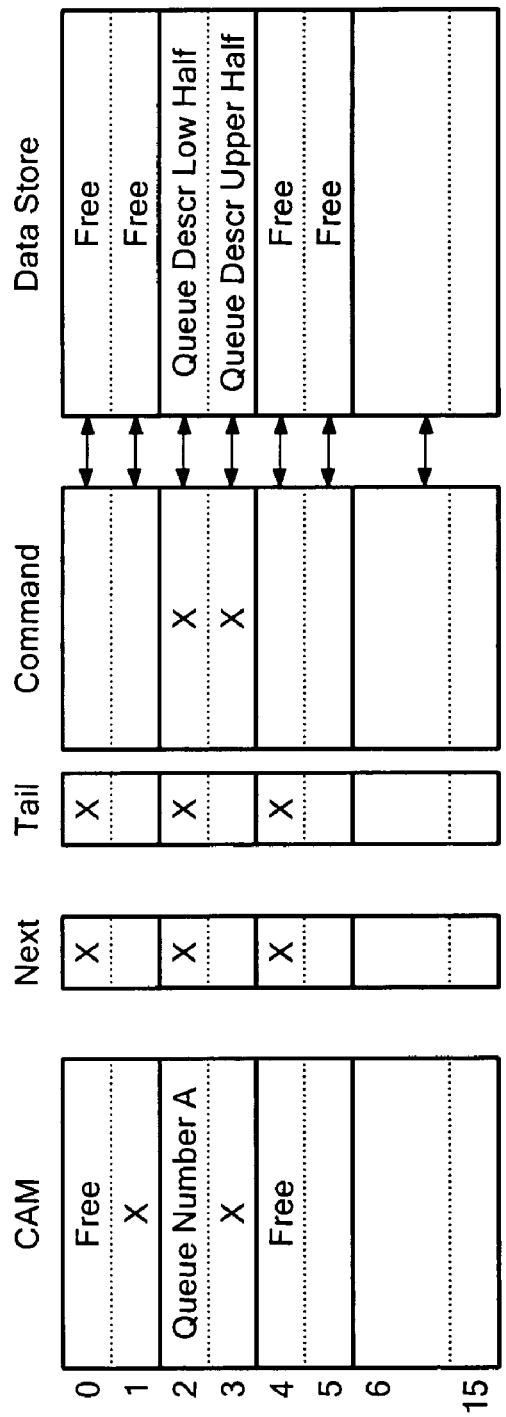
Figure 12D:
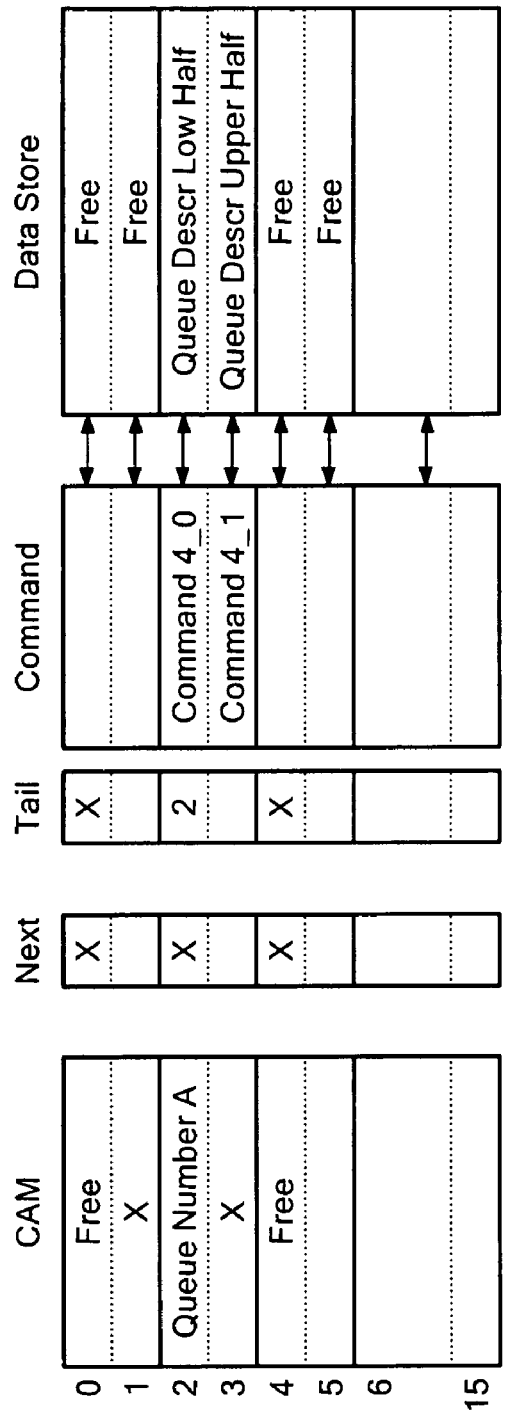

When the commands from the link list have been serviced, the queue descriptor is written back to memory. In one embodiment, the queue descriptor is not invalidated right away but is rather cached as shown in FIG. 12C. The compare flag for the CAM entry is set and the entry is made free. If the given CAM entry is needed, the queue descriptor is invalidated (since it has already been written back) and the entry is used. If the CAM entry gets a hit in the meantime, the compare flag is set and the queue descriptor resident in the data store field is used to service this command (the fourth command) as shown in FIG. 12D.

With this arrangement, memory bandwidth is saved if there is a relatively high level of activity on a single queue. Back-to-back dequeues from the same queue are not problematic because multiple reads for multiple dequeues can be launched simultaneously.

It is understood that the above-defined structures are also applicable to swappable ring structures. Rings are analogous to queues and ring descriptors are analogous to queue descriptors, as is well known to one of ordinary skill in the art.

Figure 13:
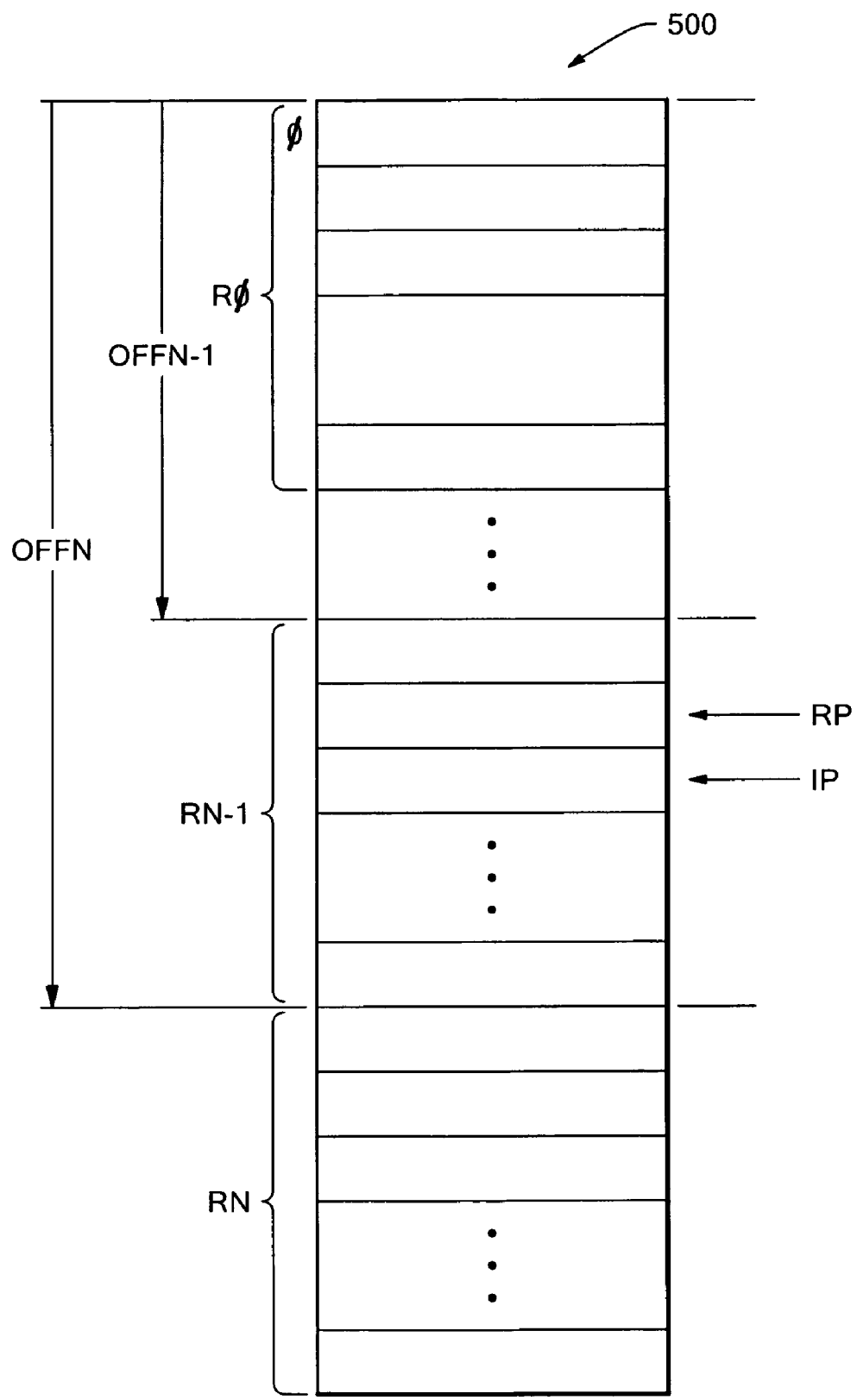
FIG. 13 is a schematic depiction of a ring structure.

FIG. 13 shows an exemplary memory 500 containing a series of rings R0-RN, each of which is defined by a respective offset OFF0-OFFN. Each ring, as shown for ring RN only for clarity, has an insert pointer IP and a remove pointer RP. The insert pointer IP points to the next location in which data will be written to the ring and the remove pointer points to the location from which data will be extracted. Each ring has a maximum size after which the pointers wrap to stay within the area of memory designated for the given ring. In general, the rings can be considered circular buffers To utilize the rings, the requesting processing element transmits the ring number along with a put or get command and the ring base address is stored in the CAM. When a new ring request is received, the ring base address (instead of the queue number as described above) is used to check the CAM. If there is a CAM hit, a ready state is entered in which the on chip resident ring descriptor is used and the command (put or get) performed.

If the CAM hit results in a transition to a pending state, the received command is put into the linked list and serviced when the ring descriptor has been read by previous command.

If the CAM lookup results in a miss, a new entry is allocated and a read is launched for the ring descriptor. The CAM then enters the pending state. When the ring descriptor is returned from memory, the command that initiated the ring descriptor read is serviced. If there are more commands in the link list behind the current command, then they are serviced as well.

With this arrangement a relatively large number of memory rings can be supported. If a given ring is used frequently enough, it will be cached in CAM most of the time resulting in saving of memory bandwidth.

Other embodiments are within the scope of the following claims.

What is claimed is:

1. A processor system comprising:
a content addressable memory (CAM) comprising:
a plurality of CAM entries each comprising:
a tag field;
first and second pointer fields to contain pointers to define a link list of information in the tag field;
a command store field to store at least a portion of a command; and
a data store field to store data associated with the command,
wherein at least some of the data associated with the command is configured to have a first portion stored in the data store field of a first one of the plurality of CAM entries and a second portion stored in the data store field of a second one of the plurality of CAM entries,
wherein the data store field of the first one of the plurality of CAM entries and the data store field of the second one of the plurality of CAM entries are configured to store a queue descriptor.

2. The method of claim 1 wherein the queue descriptor comprises a remove pointer, a remove residue, an insert pointer and an insert residue.

3. The system according to claim 1, wherein the command store field ranges from 8 to 12 bytes.

4. The system according to claim 1, wherein the data store field is at least 8 bytes.

5. The system according to claim 1, wherein the command includes an enqueue command having a plurality of operands with at least one of queue number, first buffer descriptor, subsequent block address, last buffer descriptor location, and new block address.

6. The system according to claim 1, wherein the CAM includes a first portion to store queuing command information in a single CAM entry and a second portion to store queuing command information in multiple CAM entries.

7. A network forwarding device, comprising:
a switch fabric; and
multiple line cards interconnected by the switch fabric, individual ones of the line cards comprising:
a network processor unit including:
a content addressable memory (CAM), comprising:
a plurality of CAM entries each comprising:
a tag field;
first and second pointer fields to contain pointers to define a link list of information in the tag field;
a command store field to store at least a portion of a command; and
a data store field to store data associated with the command,
wherein at least some of the data associated with the command is configured to have a first portion stored in the data store field of a first one of the plurality of CAM entries and a second portion stored in the data store field of a second one of the plurality of CAM entries,
wherein the data store field of the first one of the plurality of CAM entries and the data store field of the second one of the plurality of CAM entries are configured to store a queue descriptor.

8. The network forwarding device of claim 7 wherein the queue descriptor comprises a remove pointer, a remove residue, an insert pointer and an insert residue.

9. The device according to claim 7, wherein the command includes an enqueue command having a plurality of operands with at least one of queue number, first buffer descriptor, subsequent block address, last buffer descriptor location, and new block address.

10. The device according to claim 7, wherein the CAM includes a first portion to store queuing command information in a single CAM entry and a second portion to store queuing command information in multiple CAM entries.

11. A method of storing command information in a content addressable memory (CAM), comprising:
receiving a queuing command for a first queue;
examining the CAM to determine if commands for the first queue are present;
storing information in a linked list for the received queuing command in multiple CAM entries upon determining the presence of commands for the first queue exists; and
selecting a free CAM entry upon determining no presence of commands for the first queue exists,
wherein each CAM entry each comprises:
a tag field;
first and second pointer fields to contain pointers to define a link list of information in the tag field;
a command store field to store at least a portion of a command; and
a data store field to store data associated with the command,
wherein the received queuing command has an associated queuing descriptor to be stored in data store fields of multiple CAM entries.

12. The method according to claim 11, further comprising configuring the CAM to include a first portion to store command information in a single CAM entry and a second portion to store command information in multiple CAM entries.

13. The method according to claim 11, wherein the command includes at least two operands of queue number, first buffer descriptor, subsequent block address, last buffer descriptor location, and new block address.

14. The method according to claim 11, further comprising using a burst-of-four structure for queue descriptors having a remove residue and an insert residue.

15. The method according to claim 11, further comprising storing a first portion of the queue descriptor in the data store field of a first one of the multiple CAM entries and a second portion of the queue descriptor in the data store field of a second one of the multiple CAM entries.

16. The method of claim 11 wherein the queue descriptor comprises a remove pointer, a remove residue, an insert pointer and an insert residue.

* * * * *